(12) United States Patent
Cho

(10) Patent No.: US 12,473,009 B2
(45) Date of Patent: Nov. 18, 2025

(54) STEER BY WIRE TYPE STEERING APPARATUS

(71) Applicant: HL MANDO CORPORATION, Pyeongtaek-si (KR)

(72) Inventor: Seong Jong Cho, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 662 days.

(21) Appl. No.: 17/747,943

(22) Filed: May 18, 2022

(65) Prior Publication Data
US 2022/0379949 A1 Dec. 1, 2022

(30) Foreign Application Priority Data
May 28, 2021 (KR) .................. 10-2021-0069200

(51) Int. Cl.
*B62D 5/00* (2006.01)
(52) U.S. Cl.
CPC .................................... *B62D 5/001* (2013.01)
(58) Field of Classification Search
CPC ...................................................... B62D 5/001
See application file for complete search history.

(56) References Cited

U.S. PATENT DOCUMENTS

| | | | |
|---|---|---|---|
| 11,745,788 B2 * | 9/2023 | Shin ................... | B62D 5/001 180/402 |
| 12,037,054 B2 * | 7/2024 | Jung .................. | B62D 5/001 |
| 12,037,056 B2 * | 7/2024 | Kim ................... | B62D 5/0445 |
| 2022/0234649 A1 | 7/2022 | Kim | |

FOREIGN PATENT DOCUMENTS

| | | |
|---|---|---|
| DE | 102021206212 | 12/2021 |
| KR | 10-2173997 | 11/2020 |
| WO | 2020184883 | 9/2020 |
| WO | 2020256426 | 12/2020 |

OTHER PUBLICATIONS

Office Action dated Sep. 27, 2023 for German Patent Application No. 102022205249.8. and its English machine translation from Google Translate.
Office Action (1st) dated Oct. 9, 2025 for Korean Patent Application No. 10-2021-0069200 and its English translation from Global Dossier.

* cited by examiner

*Primary Examiner* — Kevin Hurley
(74) *Attorney, Agent, or Firm* — WOMBLE BOND DICKINSON (US) LLP

(57) ABSTRACT

The present embodiments provide a steer by wire type steering apparatus including a screw shaft coupled to the steering shaft to rotate and having an outer circumferential screw portion formed on an outer circumferential surface, a moving member coupled to an outer peripheral side of the screw shaft, an inner circumferential screw portion corresponding to the outer circumferential screw portion being formed on an inner circumferential surface to move in an axial direction when the screw shaft rotates, a housing formed in a cylindrical shape and having the screw shaft and the moving member disposed therein, and at least one guide member provided in the housing to support the outer peripheral side of the moving member and guide the axial movement of the moving member.

20 Claims, 10 Drawing Sheets

STEER BY WIRE TYPE STEERING APPARATUS

CROSS REFERENCE TO RELATED APPLICATION

This application claims priority from Korean Patent Application No. 10-2021-0069200, filed on May 28, 2021, which is hereby incorporated by reference for all purposes as if fully set forth herein.

TECHNICAL FIELD

The present embodiments relate to a steer by wire steering system, and more particularly, to a steer by wire steering system capable of mechanically stopping the steering wheel from rotating further when the rotation of the wheel reaches its maximum point.

RELATED ART

In general, power steering has been developed and applied to a vehicle steering apparatus to provide convenience in driving operation by assisting a driver's operating force of a steering wheel. Power steering was developed and applied in hydraulic type using hydraulic pressure, electro-hydraulic type using hydraulic pressure and electric power of the motor at the same time, and electric type using only electric power of the motor.

Recently, instead of removing a mechanical connection device such as a steering column or a universal joint or a pinion shaft between the steering wheel and the wheel, the Steer By Wire (SBW) type steering system for steering a vehicle using an electric motor has been developed and applied.

However, in the case of such a steer by wire type steering system, since there is no mechanical connection between the steering shaft and the wheels, the driver's steering wheel rotation can rotate indefinitely, thereby reducing the driver's steering feeling and steering stability.

Therefore, when the rotation of the wheel reaches its maximum point (when the steering wheel or the wheel is in a full-turn state in a general steering system), there is a need for research to prevent the steering wheel from rotating any more.

DETAILED DESCRIPTION OF THE INVENTION

Technical Problem

The present embodiments provide a steer by wire steering device capable of increasing a driver's steering feel and steering stability by preventing the steering wheel from mechanically rotating any more when the rotation of the wheel reaches the maximum point.

In addition, the purpose of the present embodiments is not limited thereto, and other objects not mentioned will be clearly understood by those skilled in the art from the following description.

Technical Solution

The present embodiments provide a steer by wire type steering apparatus including a screw shaft coupled to the steering shaft to rotate and having an outer circumferential screw portion formed on an outer circumferential surface, a moving member coupled to an outer peripheral side of the screw shaft, an inner circumferential screw portion corresponding to the outer circumferential screw portion being formed on an inner circumferential surface to move in an axial direction when the screw shaft rotates, a housing formed in a cylindrical shape and having the screw shaft and the moving member disposed therein, and at least one guide member provided in the housing to support the outer peripheral side of the moving member and guide the axial movement of the moving member.

Advantageous Effects

According to the present embodiments, there is provided a steer by wire type steering apparatus that increases a driver's steering feel and steering safety by preventing the steering wheel from mechanically rotating any more when the rotation of the wheel reaches the maximum point.

MODE FOR CARRYING OUT THE INVENTION

Figure 1:
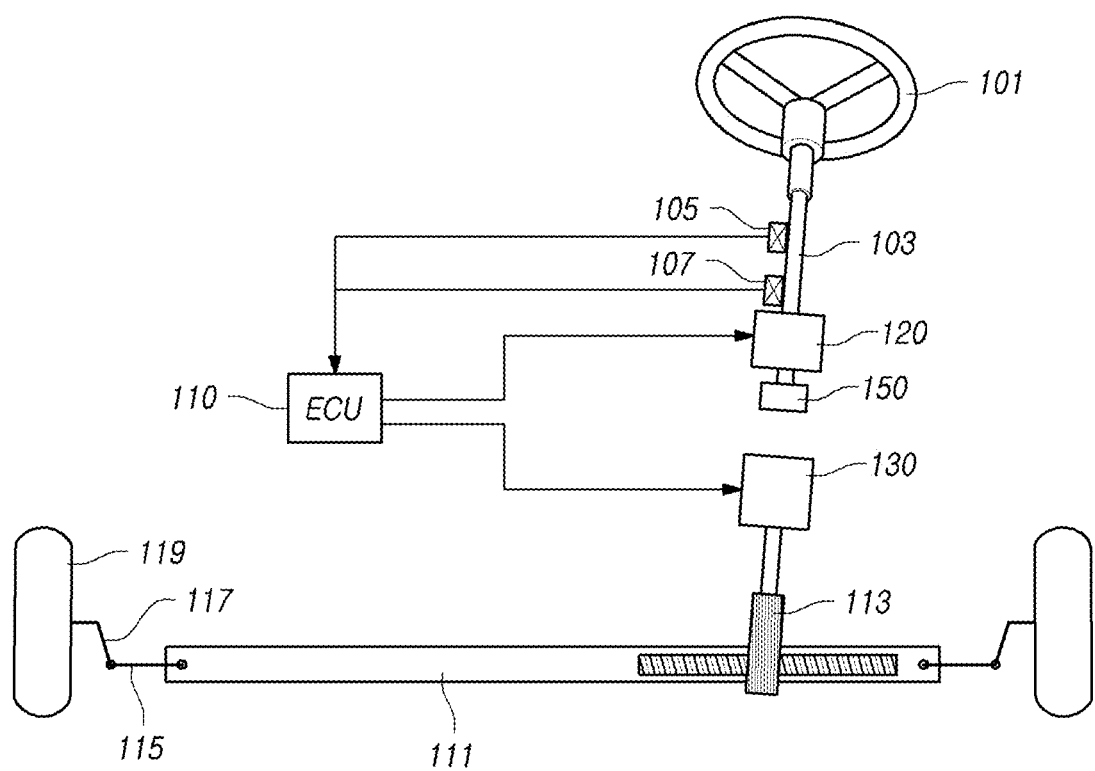
FIG. 1 is a schematic view schematically showing a steer by wire type steering apparatus according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
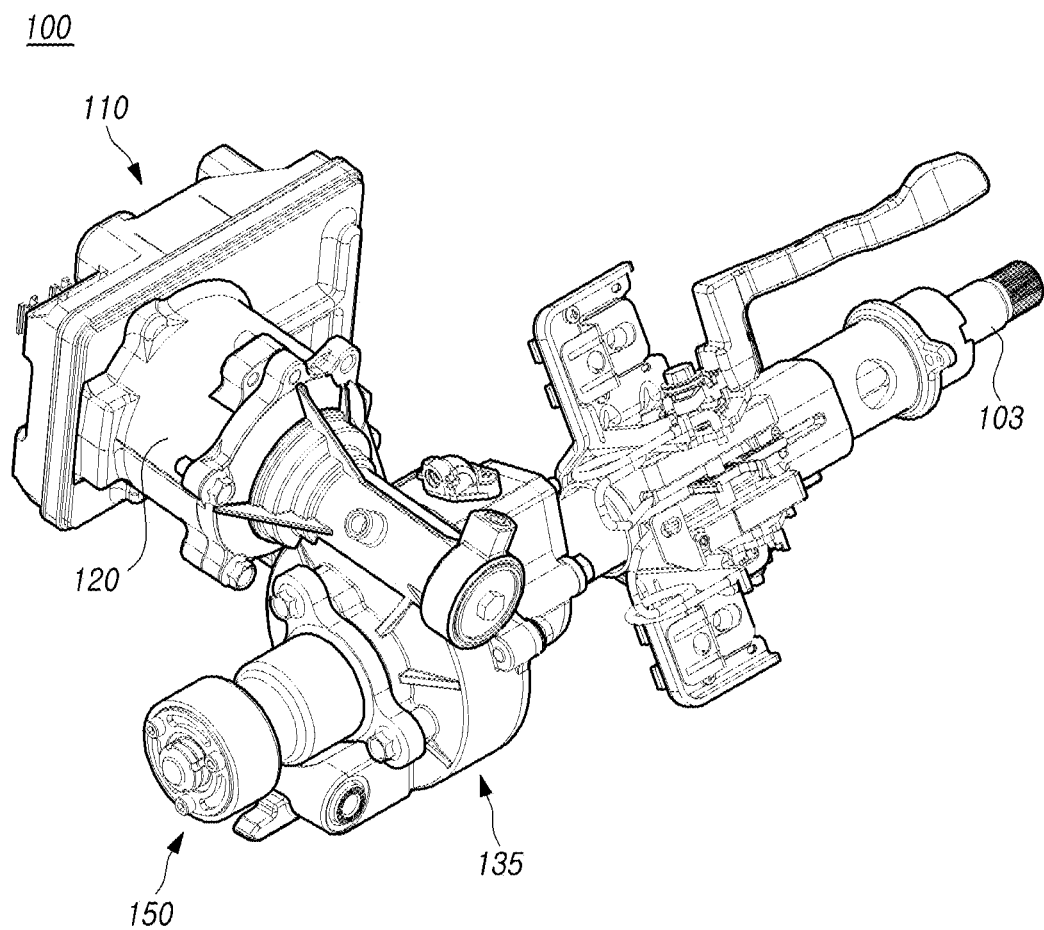
FIG. 2 is perspective views showing some of the steer by wire type steering apparatus according to the present embodiments.
Figure 3:
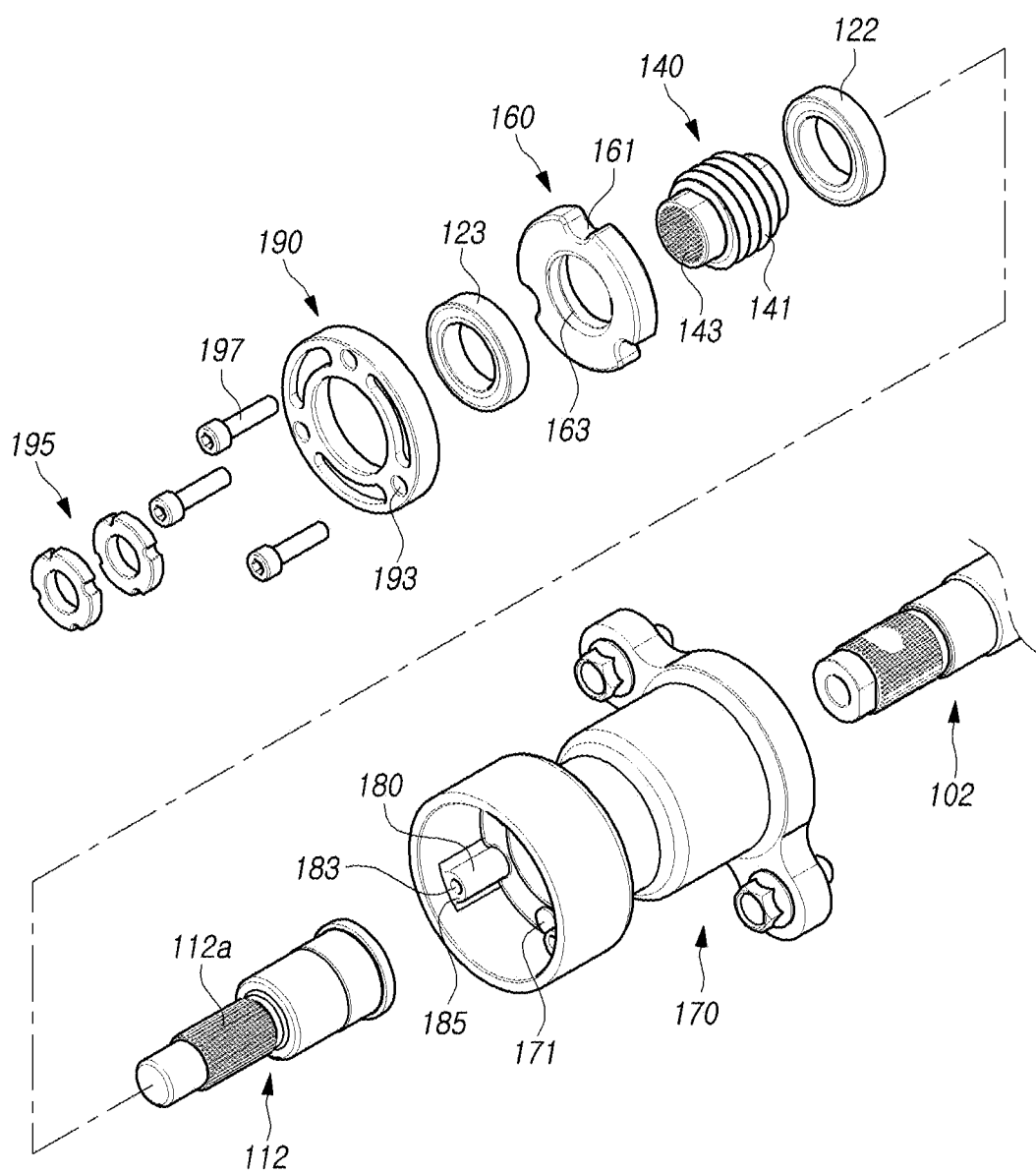
FIGS. 3 to 6 are exploded perspective views showing some of the steer by wire type steering apparatus according to the present embodiments.
Figure 4:
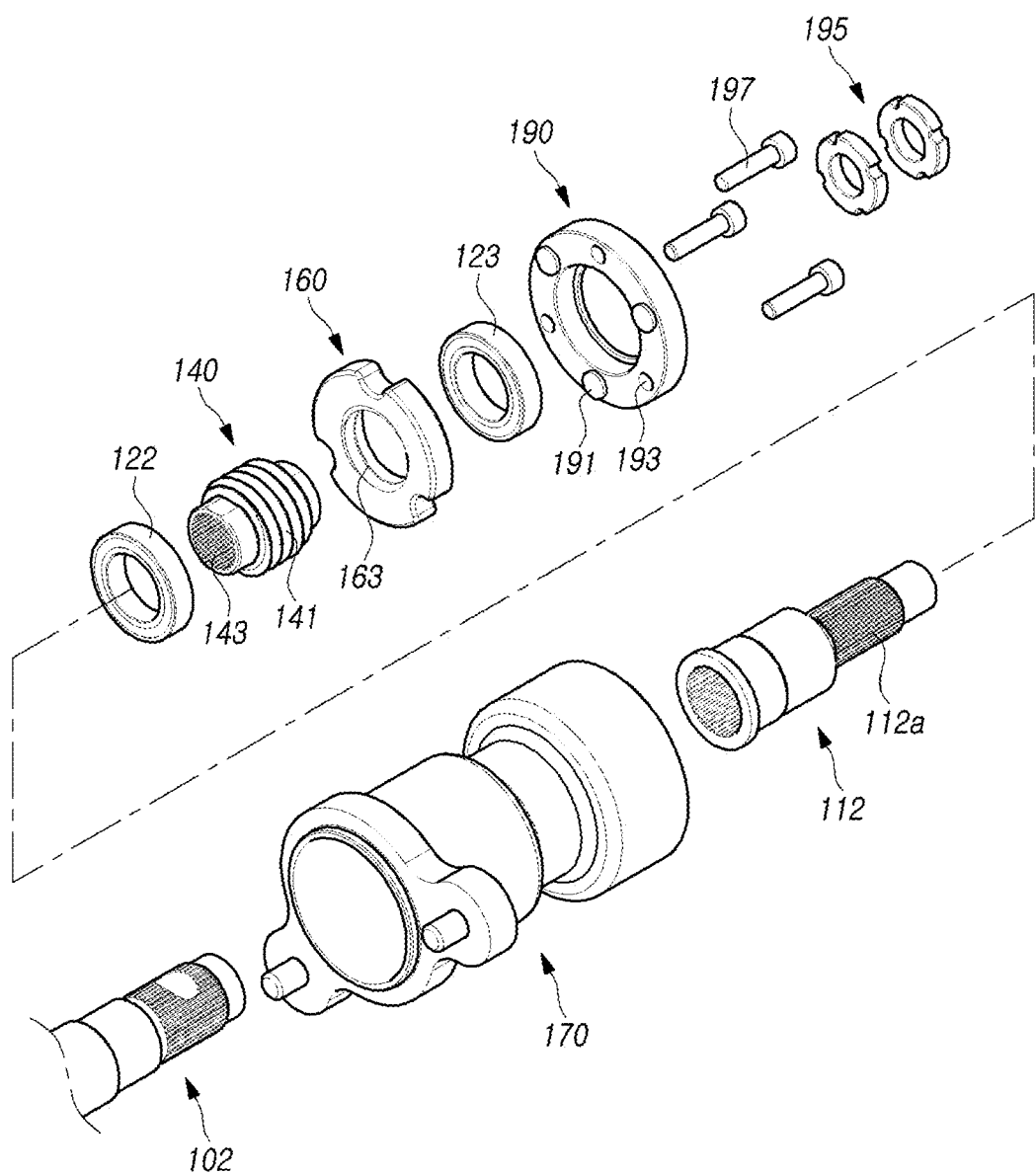
Figure 5:
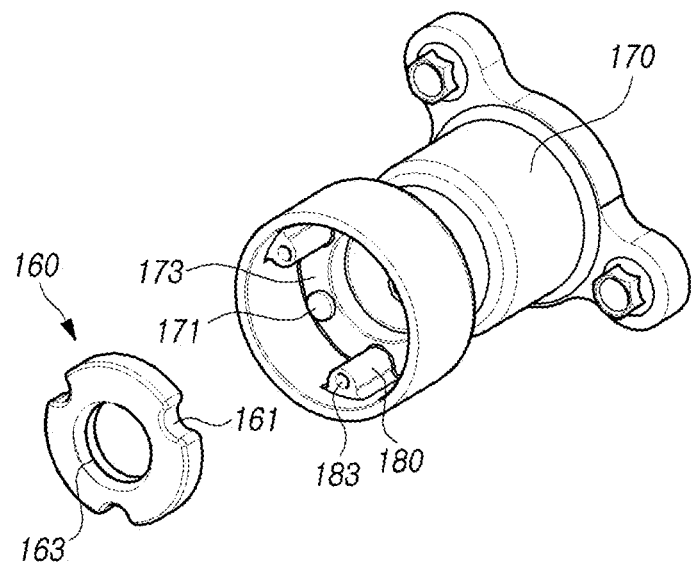
Figure 6:
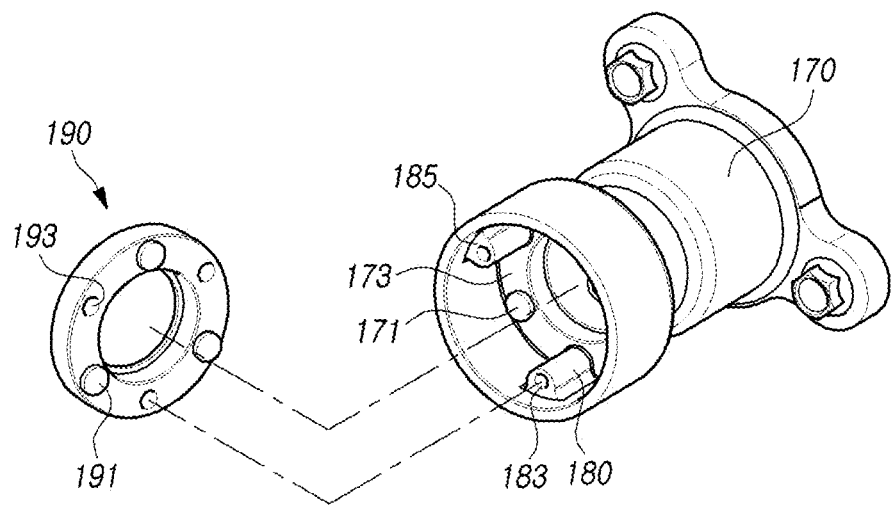
Figure 7:
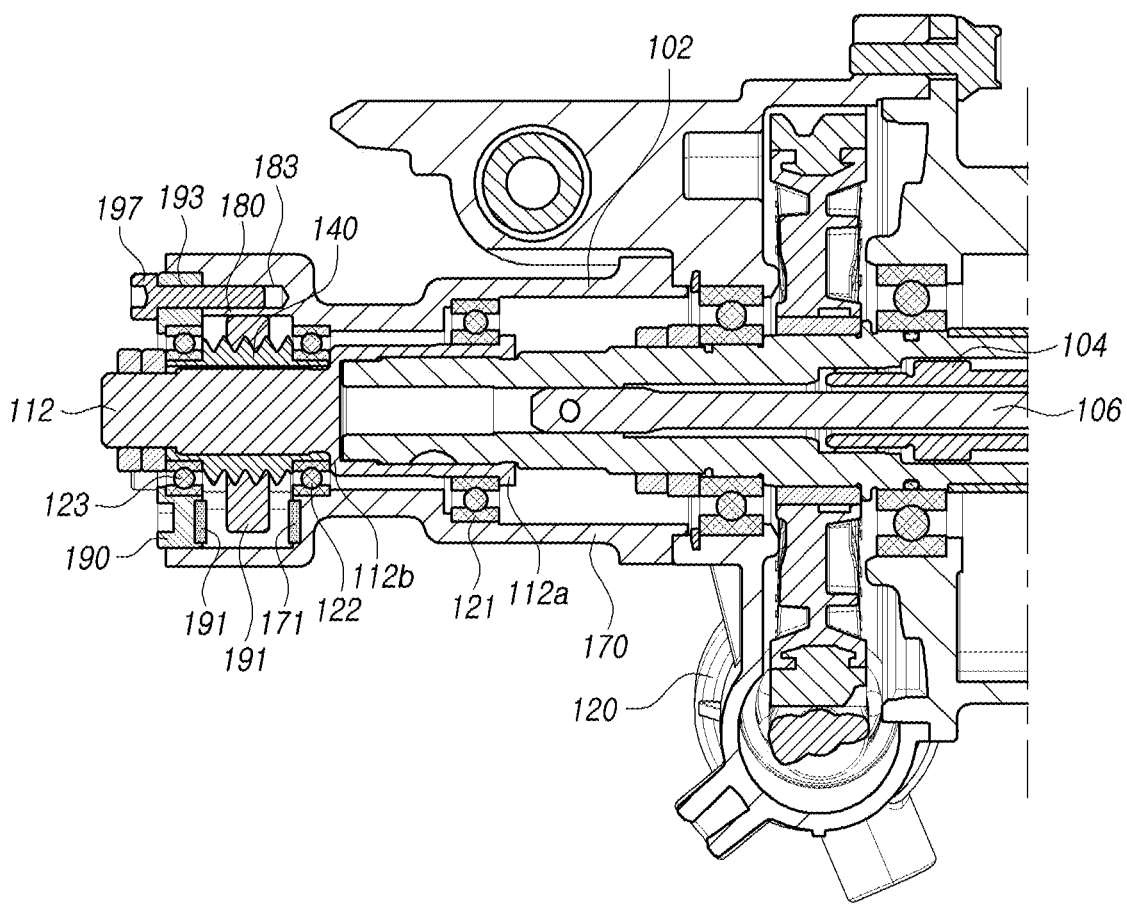
FIG. 7 is a cross-sectional view showing a part of the steer by wire type steering apparatus according to the present embodiments.
Figure 8:
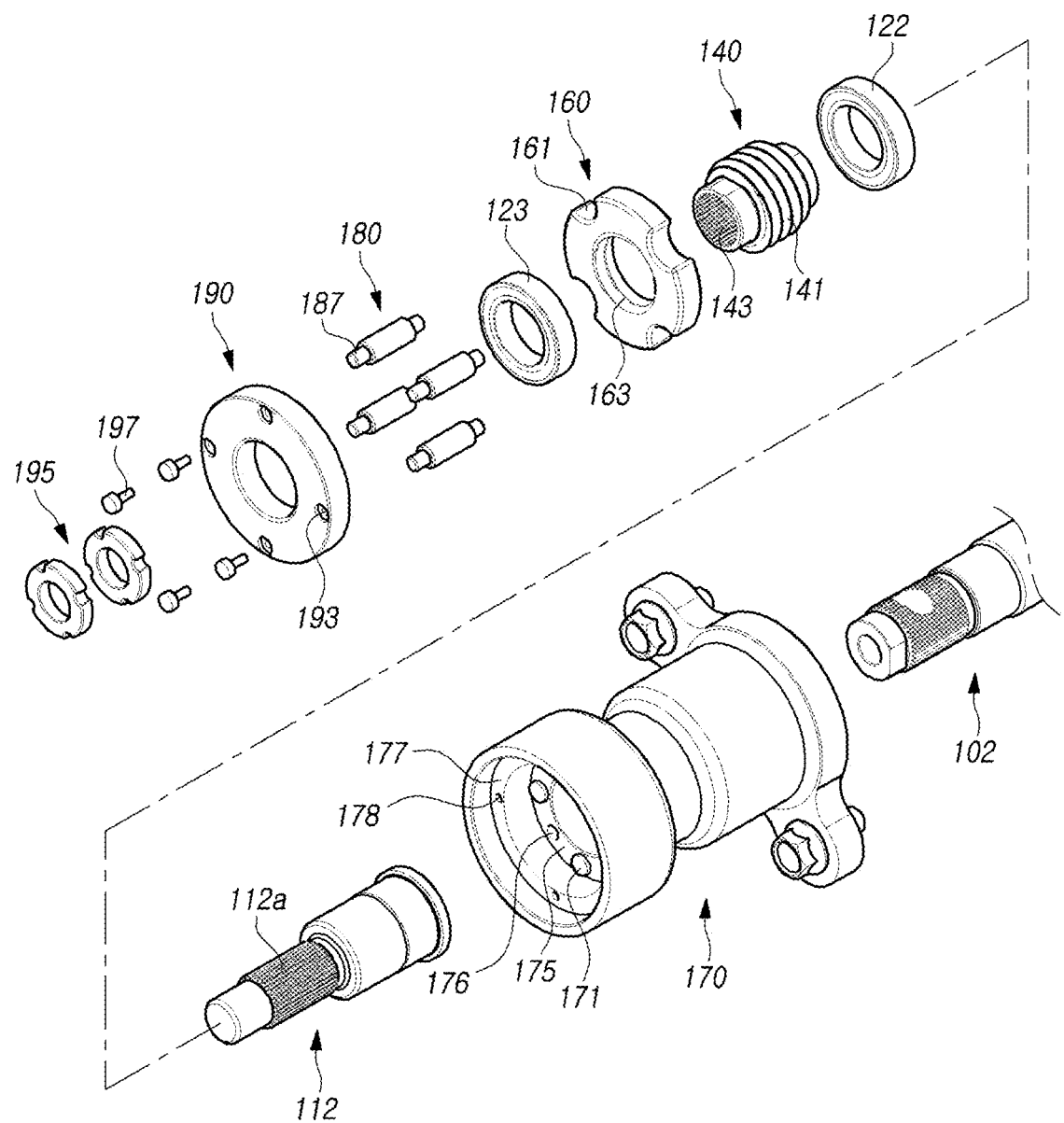
FIGS. 8 and 9 are exploded perspective views showing some of the steer by wire type steering apparatus according to the present embodiments.
Figure 9:
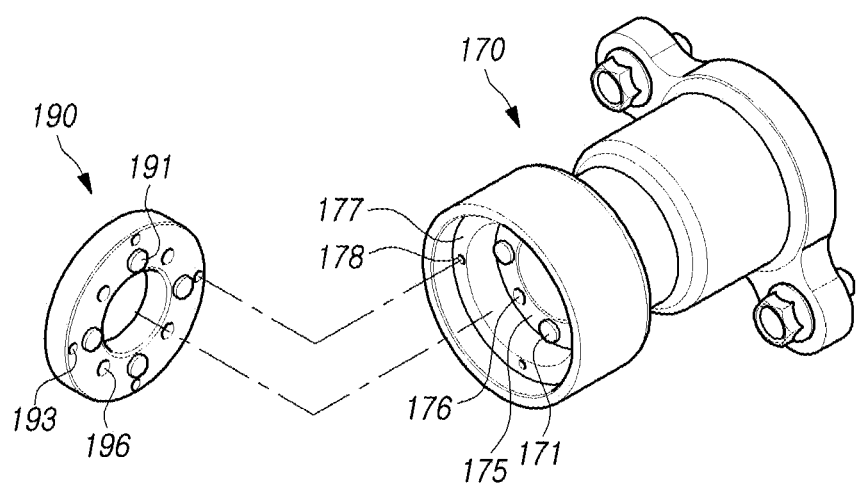
Figure 10:
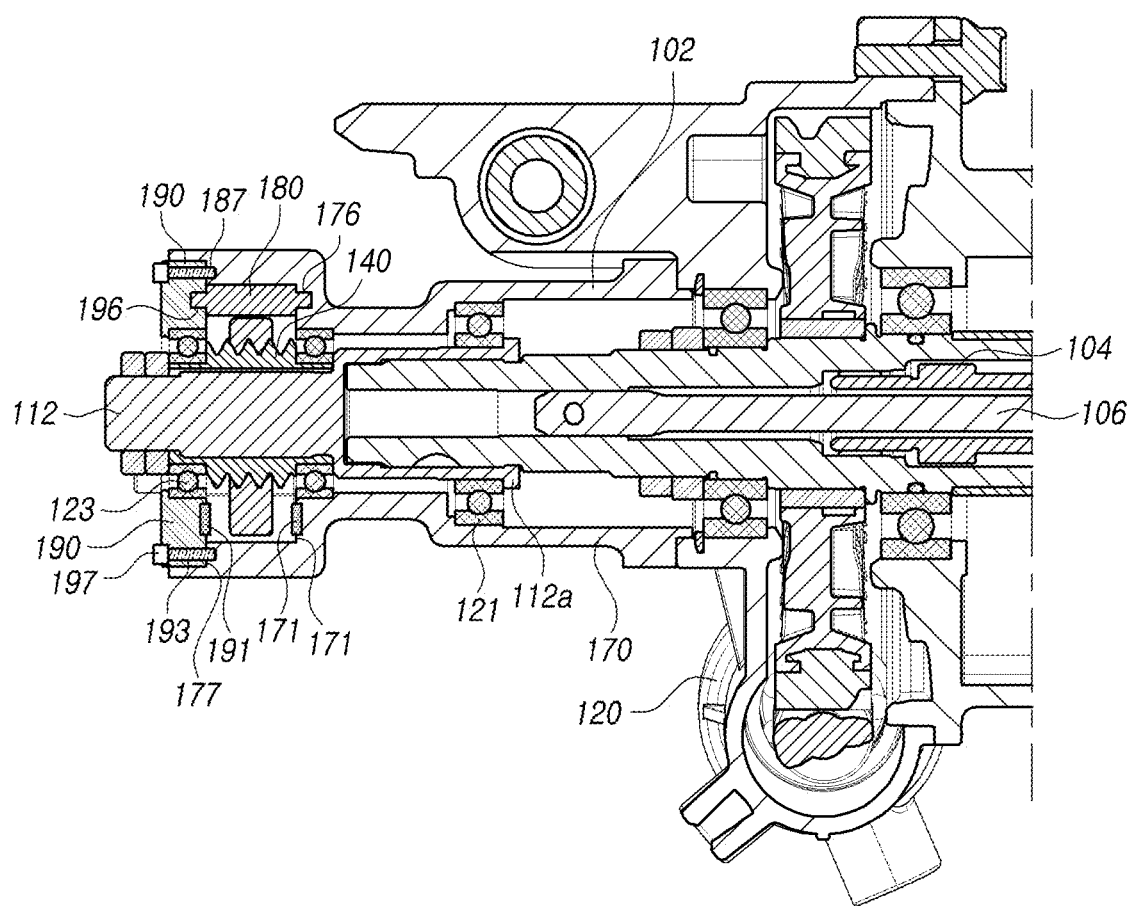
FIG. 10 is a cross-sectional view showing a part of the steer by wire type steering apparatus according to the present embodiments.

FIG. 1 is a schematic view schematically showing a steer by wire type steering apparatus according to the present embodiments. FIG. 2 is perspective views showing some of the steer by wire type steering apparatus according to the present embodiments. FIGS. 3 to 6 are exploded perspective views showing some of the steer by wire type steering apparatus according to the present embodiments. FIG. 7 is a cross-sectional view showing a part of the steer by wire type steering apparatus according to the present embodiments. FIGS. 8 and 9 are exploded perspective views showing some of the steer by wire type steering apparatus according to the present embodiments. FIG. 10 is a cross-sectional view showing a part of the steer by wire type steering apparatus according to the present embodiments.

As illustrated in FIGS. 1 to 10, a steer by wire type steering apparatus according to the present embodiments include a screw shaft 140 coupled to the steering shaft 103 to rotate and having an outer circumferential screw portion 141 formed on an outer circumferential surface, a moving member 160 coupled to an outer peripheral side of the screw shaft 140, an inner circumferential screw portion 161 corresponding to the outer circumferential screw portion 141 being formed on an inner circumferential surface to move in an axial direction when the screw shaft 140 rotates, a housing 170 formed in a cylindrical shape and having the screw shaft 140 and the moving member 160 disposed therein, and at least one guide member 180 provided in the housing 170 to support the outer peripheral side of the moving member 160 and guide the axial movement of the moving member 160.

First, referring to FIG. 1, in the steer by wire steering apparatus according to the present embodiments, an angle sensor 105 and a torque sensor 107 on one side of a steering shaft 103 connected to a steering wheel 101 is coupled, and the angle sensor 105 and the torque sensor 107 that detect this when the driver operates the steering wheel 101 send electrical signals to the electronic control device 110 to the steering shaft motor 120 and the pinion shaft motor 130 is activated.

The electronic control device 110 controls the steering shaft motor 120 and the pinion shaft motor 130 based on the electrical signals transmitted from the angle sensor 105 and the torque sensor 107 and the electrical signals transmitted from other sensors mounted on the vehicle.

The steering shaft motor 120 is connected to a speed reducer 135 for reducing the number of revolutions of the motor, and provides a reaction force to the steering shaft 103 so as to feel a steering reaction force in the opposite direction when the driver operates the steering wheel 101 during normal driving. And during autonomous driving, steering is performed by the control of the electronic control device 110 without the driver's will.

The pinion shaft motor 130 slides the rack bar 111 connected to the pinion shaft 113 to steer the wheels 119 on both sides through the tie rod 115 and the knuckle arm 117.

However, in the drawings in the present embodiments, for convenience of explanation, the angle sensor 105 and the torque sensor 107 are provided on the steering shaft 103 as an example, but a vehicle speed sensor and a motor position sensor for transmitting steering information to the electronic control device 110, various radars, lidar, image sensors such as a camera, etc. may be provided, and a detailed description thereof will be omitted below.

In such a steer by wire type steering apparatus, since the steering wheel 101 and the wheel 119 are not mechanically connected, when the driver manipulates the steering wheel 101, a mechanical restriction is required to stop the rotation of the steering wheel 101 at a certain angle.

That is, when the rotation of the wheel 119 reaches the maximum point (in a general steering device, when the steering wheel 101 or the wheel 119 is in a full-turn state), the rotation angle limiting member 150 for mechanically limiting the rotation angle of the steering shaft 103 is provided so that the steering wheel 101 is not rotated anymore. Thus, it provides the driver with an accurate steering feeling.

The rotation angle limiting member 150 includes a screw shaft 140 provided at the lower end of the steering column 100 and rotating in conjunction with the steering shaft 103, a moving member 160 that moves in the axial direction when the screw shaft 140 rotates, a housing 170 in which the screw shaft 140 and the moving member 160 are built in and coupled to the lower portion of the steering column 100, one or more guide members 180 for guiding the axial movement while limiting the rotation of the moving member 160, etc.

The screw shaft 140 coupled with the steering shaft 103 to rotate has an outer circumferential screw portion 141 formed on an outer circumferential surface thereof. A hollow moving member 160 is coupled to the outer peripheral side of the screw shaft 140 to move in the axial direction.

The moving member 160 is coupled to the outer circumferential side of the screw shaft 140, and an inner circumferential screw portion 161 corresponding to the outer circumferential screw portion 141 of the screw shaft 140 is formed on the inner circumferential surface. Accordingly, when the screw shaft 140 rotates, the moving member 160 is supported by the guide member 180 and moves in the axial direction.

In addition, a housing 170 formed in a cylindrical shape and having a screw shaft 140 and a moving member 160 disposed therein is coupled to a lower portion of the steering column 100. One or more guide members 180 are provided in the housing 170 to prevent rotation of the movable member 160 by guiding the axial movement of the movable member 160 while the outer peripheral side of the movable member 160 is supported.

One or more guide grooves 161 into which the guide member 180 is inserted and supported are provided on the outer peripheral side of the movable member 160 formed in the shape of a hollow disk. Accordingly, the movement in the axial direction is guided while the rotation of the moving member 160 is restricted by the guide member 180.

The steering shaft 103 includes a first output shaft 102 connected to the input shaft 104 and a second output shaft 112 coupled to an outer circumferential surface of the screw shaft 140. The input shaft 104 and the first output shaft 102 are coupled via a torsion bar 106.

A first bearing 121 for supporting the rotation of the second output shaft 112 is coupled between the outer peripheral surface of one end of the second output shaft 112 and the inner peripheral surface of the housing 170. One end of the second output shaft 112 is provided with a protruding end 112a so that the inner ring of the first bearing 121 is supported in the axial direction. The outer ring of the first bearing 121 is supported in the axial direction by the locking jaws on the inner circumferential surface of the housing 170.

In addition, serrations 112a and 143 corresponding to each other are provided on the outer circumferential surface of the second output shaft 112 and the inner circumferential surface of the screw shaft 140, so that when the steering shaft 103 rotates, the second output shaft 112 and the screw shaft (140) is rotated by interlocking without spinning.

In addition, a cover member 190 through which the screw shaft 140 and the second output shaft 112 pass is coupled to the end of the housing 170. Therefore, when the moving member 160 moves in the axial direction, it is supported by the cover member 190 to limit the moving distance.

A second bearing 122 supporting rotation of the screw shaft 140 is coupled between the outer circumferential surface of one end of the screw shaft 140 and the inner circumferential surface of the housing 170. A large diameter portion 112b for supporting the inner ring of the second bearing 122 in the axial direction is provided in the middle portion of the second output shaft 112.

A third bearing 123 for supporting the rotation of the screw shaft 140 is coupled between the outer circumferential surface of the other end of the screw shaft 140 and the inner circumferential surface of the cover member 190. A fixing member 195 for supporting the inner ring of the second bearing 122 and the screw shaft 140 in the axial direction is coupled to the other end of the second output shaft 112.

The housing 170 is formed in a cylindrical shape with an open end to which the cover member 190 is coupled. A stepped portion 173 having a reduced diameter is provided on one side of the housing 170 in the axial direction, and a guide member 180 is connected to the inner circumferential surface of the housing 170 in the axial direction at the stepped portion 173.

That is, the guide member 180 extends in the axial direction from the stepped portion 173, is integrally formed with the housing 170, and is connected to the inner circumferential surface of the housing 170. So the guide member 180 is inserted into the guide groove 161 of the moving member 160.

Here, two or more guide members 180 are spaced apart from each other in the circumferential direction of the housing 170 and may be disposed at the same distance. In the present embodiment, three guide members 180 are illustrated as an example.

In addition, the end 185 of the guide member 180 connected to the inner circumferential surface of the housing 170 and the stepped portion 173 is provided to a position spaced apart from the end of the housing 170 by a predetermined distance. Therefore, the cover member 190 is inserted into the inner peripheral surface of the end of the housing 170 and is seated on the end 185 of the guide member 180.

The guide member 180 is provided with a communication hole 183 communicating with the fastening hole 193 provided in the cover member 190. Accordingly, the cover member 190 is fixed by the fastening member 197 coupled to the fastening hole 193 and the communication hole 183.

At least one housing damper 171 for supporting one side of the moving member 160 in contact with the moving member 160 is provided in the stepped portion 173 of the housing 170 to prevent shock and noise due to contact do. A coupling groove to which the housing damper 171 is coupled may be provided in the stepped portion 173.

In addition, at least one cover damper 191 for supporting the other side of the moving member 160 when the cover member 190 comes into contact with the moving member 160 is provided to prevent shock and noise due to the contact.

That is, when the moving member 160 moves to one side in the axial direction due to the rotation of the screw shaft 140, it comes into contact with the housing damper 171 of the stepped portion 173 and stops without further movement. And, when the moving member 160 moves to the other side in the axial direction, it comes into contact with the cover damper 191 of the cover member 190 to stop the movement, thereby limiting the rotation angle of the steering shaft 103.

In addition, the housing 170 is formed in a cylindrical shape with an open end to which the cover member 190 is coupled, as shown in FIG. 8. And a seating end 177 on which the cover member 190 is seated is provided at a position spaced apart from the end of the housing 170 in the axial direction.

The seating end 177 is provided with a fixing hole 178 communicating with the fastening hole 193 provided in the cover member 190. So the cover member 190 is fixed by a fastening member 197 coupled to the fastening hole 193 and the fixing hole 178.

In addition, a support end 175 having a reduced diameter is provided at a position spaced apart from the seating end 177 in the axial direction, and the guide member 180 is supported and coupled to the support end 175.

Here, as shown in FIGS. 8 and 10, the guide member 180 is formed in a long rod shape in the axial direction, and both ends are coupled while supporting the support end 175 and the cover member 190 of the housing 170, respectively. Therefore, the guide member 180 guides the movement in the axial direction while preventing rotation of the moving member 160. In the present embodiments, four guide members 180 and four guide grooves 161 are illustrated as an example.

In addition, the support end 175 is provided with a support groove 176, and the cover member 190 is provided with a cover groove 196 at a position corresponding to the support groove 176 in the axial direction, so that the guide member 180 is fixed. Both ends of the guide member 180 are provided with a support groove 176 and a protrusion 187 inserted into the cover groove 196, respectively, so that the guide member 180 is coupled and fixed to the support end 175 and the cover member 190.

In addition, at least one housing damper 171 for supporting one side of the moving member 160 when it comes into contact with the moving member 160 is provided at the support end 175 to prevent shock and noise caused by the contact.

At least one cover damper 191 for supporting the other side of the moving member 160 when the cover member 190 is in contact with the moving member 160 is also provided to absorb shock and noise caused by the contact. In addition, even if vibration or shock is transmitted during driving of the vehicle, rattle noise is prevented from being generated.

Here, the housing damper 171 and the cover damper 191 are formed of an elastic low-friction member to prevent slip noise due to contact and friction when the moving member 160 moves in the axial direction.

As described above, according to the present embodiments, there is provided a steer by wire type steering apparatus that increases a driver's steering feel and steering safety by preventing the steering wheel from mechanically rotating any more when the rotation of the wheel reaches the maximum point.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A steer by wire type steering apparatus, comprising:
   a screw shaft coupled to a steering shaft to rotate and having an outer circumferential screw portion formed on an outer circumferential surface;
   a moving member coupled to an outer peripheral side of the screw shaft, an inner circumferential screw portion corresponding to the outer circumferential screw portion being formed on an inner circumferential surface to move in an axial direction when the screw shaft rotates;
   a housing formed in a cylindrical shape and having the screw shaft and the moving member disposed therein; and
   at least one guide member provided in the housing to support the outer peripheral side of the moving member and guide the axial movement of the moving member.

2. The steer by wire type steering apparatus of claim 1, wherein one or more guide grooves in which the guide member is inserted and supported are provided on the outer peripheral side of the moving member.

3. The steer by wire type steering apparatus of claim 1, wherein the steering shaft includes a first output shaft connected to a input shaft and a second output shaft coupled to an outer circumferential surface of the screw shaft.

4. The steer by wire type steering apparatus of claim 3, wherein a first bearing supporting rotation of the second output shaft is coupled between an outer peripheral surface of one end of the second output shaft and an inner peripheral surface of the housing.

5. The steer by wire type steering apparatus of claim 3, wherein serrations having shapes corresponding to each other are provided on the outer circumferential surface of the second output shaft and the inner circumferential surface of the screw shaft, so that the second output shaft and the screw shaft are interlocked and rotated when the steering shaft rotates.

6. The steer by wire type steering apparatus of claim 3, wherein a cover member through which the screw shaft and the second output shaft pass is coupled to an end of the housing.

7. The steer by wire type steering apparatus of claim 6, wherein a second bearing supporting rotation of the screw shaft is coupled between an outer circumferential surface of one end of the screw shaft and an inner circumferential surface of the housing.

8. The steer by wire type steering apparatus of claim 7, wherein a large-diameter portion for supporting the inner ring of the second bearing in the axial direction is provided on the second output shaft.

9. The steer by wire type steering apparatus of claim 8, wherein a third bearing supporting rotation of the screw shaft is coupled between the outer circumferential surface of the other end of the screw shaft and the inner circumferential surface of the cover member.

10. The steer by wire type steering apparatus of claim 9, wherein a fixing member for supporting the inner ring of the second bearing and the screw shaft in the axial direction is coupled to the other end of the second output shaft.

11. The steer by wire type steering apparatus of claim 6, wherein the housing is formed in a cylindrical shape with an open end to which the cover member is coupled, a stepped portion with a reduced diameter is provided on one side of the axial direction of the housing, and the guide member is connected in the axial direction from the stepped portion to an inner circumferential surface.

12. The steer by wire type steering apparatus of claim 11, wherein two or more of the guide members are spaced apart from each other in the circumferential direction of the housing and disposed at the same distance.

13. The steer by wire type steering apparatus of claim 12, wherein an end of the guide member is provided at a position spaced apart from the end of the housing, the cover member is seated on the end of the guide member, and the guide member is provided with a communication hole communicating with the fastening hole provided in the cover member.

14. The steer by wire type steering apparatus of claim 11, wherein at least one housing damper for supporting one side of the moving member when in contact with the moving member is provided on the stepped portion of the housing.

15. The steer by wire type steering apparatus of claim 11, wherein at least one cover damper for supporting the other side surface of the moving member when in contact with the moving member is provided on the cover member.

16. The steer by wire type steering apparatus of claim 6, wherein the housing is formed in a cylindrical shape with an open end to which the cover member is coupled, and a seating end portion on which the cover member is seated is provided at a position spaced apart from the end of the housing in the axial direction, and a fixing hole communicating with a fastening hole provided in the cover member is provided at the seating end.

17. The steer by wire type steering apparatus of claim 16, wherein the housing is provided with a support end having a reduced diameter at a position spaced apart from the seating end in the axial direction, the guide member is formed in a rod shape, and both ends support the support end and the cover member, respectively, and are coupled thereto.

18. The steer by wire type steering apparatus of claim 17, wherein the support end is provided with a support groove, the cover member is provided with a cover groove at a position corresponding to the support groove in the axial direction, and both ends of the guide member are provided with protrusions inserted into the support groove and the cover groove, respectively.

19. The steer by wire type steering apparatus of claim 17, wherein at least one housing damper for supporting one side of the moving member when in contact with the moving member is provided at the support end.

20. The steer by wire type steering apparatus of claim 17, wherein at least one cover damper for supporting the other side surface of the moving member when in contact with the moving member is provided on the cover member.

\* \* \* \* \*